(12) United States Patent
Brewer et al.

(10) Patent No.: US 6,360,232 B1
(45) Date of Patent: Mar. 19, 2002

(54) DISASTER RECOVERY METHOD FOR A REMOVABLE MEDIA LIBRARY

(75) Inventors: Vickie Lynn Brewer; James Arthur Fisher, both of Tucson; Gregory Tad Kishi, Oro Valley, all of AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/324,901

(22) Filed: Jun. 2, 1999

(51) Int. Cl.[7] .......................... G06F 17/30; G06F 11/00; G11B 5/09
(52) U.S. Cl. .............................. 707/204; 707/1; 714/6; 360/51
(58) Field of Search .................. 707/1, 204; 714/4, 714/6, 5, 11–19; 369/34; 711/100–112; 360/48–51

(56) References Cited

U.S. PATENT DOCUMENTS

| 5,537,585 A | 7/1996 | Blickenstaff et al. ....... 395/600 |
|---|---|---|
| 5,546,557 A | 8/1996 | Allen et al. .................. 395/438 |
| 5,625,820 A | 4/1997 | Hermsmeier et al. ....... 395/618 |
| 5,673,382 A | 9/1997 | Cannon et al. ........ 395/182.04 |
| 5,682,513 A | 10/1997 | Candelrie et al. ........... 395/440 |
| 5,870,732 A | * 2/1999 | Fisher et al. .................... 707/1 |
| 5,987,621 A | * 11/1999 | Duso et al. ..................... 714/4 |
| 6,052,341 A | * 4/2000 | Bingham et al. .............. 369/34 |
| 6,148,412 A | * 11/2000 | Cannon et al. ................ 714/6 |
| 6,266,784 B1 | * 7/2001 | Hsiao et al. .................... 714/6 |

* cited by examiner

Primary Examiner—Thomas Black
Assistant Examiner—Te Yu Chen
(74) Attorney, Agent, or Firm—Douglas R. Millett

(57) ABSTRACT

A removable media storage library comprises a plurality of removable media divided into a plurality of sets, each set associated with its own server. A central manager controls access to all of the removable media. Each of the servers and library manager contain database map information. If this information is lost, a selected disaster recovery operation may be implemented. This flexibility in selecting the type of disaster recovery operation allows for an efficient and fast disaster recovery operation.

4 Claims, 5 Drawing Sheets

DISASTER RECOVERY METHOD FOR A REMOVABLE MEDIA LIBRARY

BACKGROUND OF THE INVENTION

1. Field of the Invention

The present invention relates to removable media libraries and more specifically to disaster recovery operations in such libraries.

2. Description of the Prior Art

Removable media libraries are used to store large amounts of computer data. The computer data is typically recorded on a plurality of removable media such as magnetic tape cartridges or optical disk cartridges. The plurality of cartridges are located in a system of storage bins which are accessible by an accessor mechanism, typically a robotic arm. The accessor mechanism moves the cartridges between the storage bins and the drives (tape drives or optical drives) for reading and writing.

Computer data stored on the removable media are typically arranged in data volume units that originally corresponded to the storage capacity of an older original data storage media, such as a reel of tape or tape cartridge or cassette, or an optical disk or cartridge. The capacity of such storage media has grown substantially in recent years. Thus, the average size of data volume units (or files) in most computer or data processing centers is significantly less than the capacity of the current removable media volumes. Most programming support for peripheral data storage is directed at only the original volume units and does not provide a general solution to storing multiple data sets in the same volume.

A virtual tape server (VTS) is a recent development the better utilizes the full capacity of a removable media cartridge (also called a media volume or a physical volume) is to store multiple data volumes (called virtual or logical volumes) on a single physical volume. Data which would have been stored in multiple, mostly unused physical volumes are collected and stored on a single physical volume in separately addressable, host-processor defined logical data storage volumes. As a result, the host processor treats logical volumes as though they were separate physical media volumes, and the library manages the access to the logical volumes by accessing the associated physical volumes. A subsystem providing automatic management of data storage having such logical volumes is called a virtual tape server. A library system may have multiple virtual tape server partitions and non-VTS partitions which are coordinated by a single library manager.

In order to manage the data within the library system, the various components of the system must contain database mapping information in their memories. This includes such information as the location of the physical volumes within the storage bins, which logical volumes correspond with which physical volumes, which virtual tape servers correspond to which physical volumes, etc. These databases are critical for operation of the library system. If one or more of these database maps is lost, then the system must have a way of reconstructing the databases in order for operation to proceed.

Current state of the art requires a lengthy and disruptive method for identifying removable media as disaster recovery volumes as part of a disaster recovery operation. The current method requires that the entire removable media library be made unavailable to all hosts, all removable media in the library must be scanned, and the library controller database must be reconstructed.

SUMMARY OF THE INVENTION

Briefly, in a preferred embodiment, the present invention comprises two new methods for identifying removable media as disaster recovery volumes as part of a disaster recovery operation comprising the steps of:

selecting a virtual tape server (VTS) to perform disaster recovery upon;

selecting to perform disaster recovery using a partial inventory method;

selecting which frames to perform the partial inventory upon;

scanning all removable media only in the selected frames;

adding newly scanned volume VOLSERS to the library controller database;

associating, via VOLSER range tables, the removable media with the appropriate VTS;

identifying the volumes associated with the VTS being recovered as disaster recovery volumes;

proceeding with the disaster recovery process which includes identifying the removable media volume with the most recent VTS database backup by mounting each volume identified as a disaster recovery volume and reading the timestamp of the database backup and subsequently mounting the most recent volume and recovering the VTS database from the volume; or alternatively, selecting a virtual tape server (VTS) to perform disaster recovery upon;

selecting to perform disaster recovery using an automatic method;

identifying the volumes associated with the VTS being recovered as disaster recovery volumes using program code;

proceeding with the disaster recovery process which includes identifying the removable media volume with the most recent VTS database backup by mounting each volume identified as a disaster recovery volume and reading the timestamp of the database backup and subsequently mounting the most recent volume and recovering the VTS database from the volume.

For a fuller understanding of the present invention, reference should be made to the following detailed description taken in conjunction with the accompanying drawings.

DESCRIPTION OF THE PREFERRED EMBODIMENTS

Figure 1:
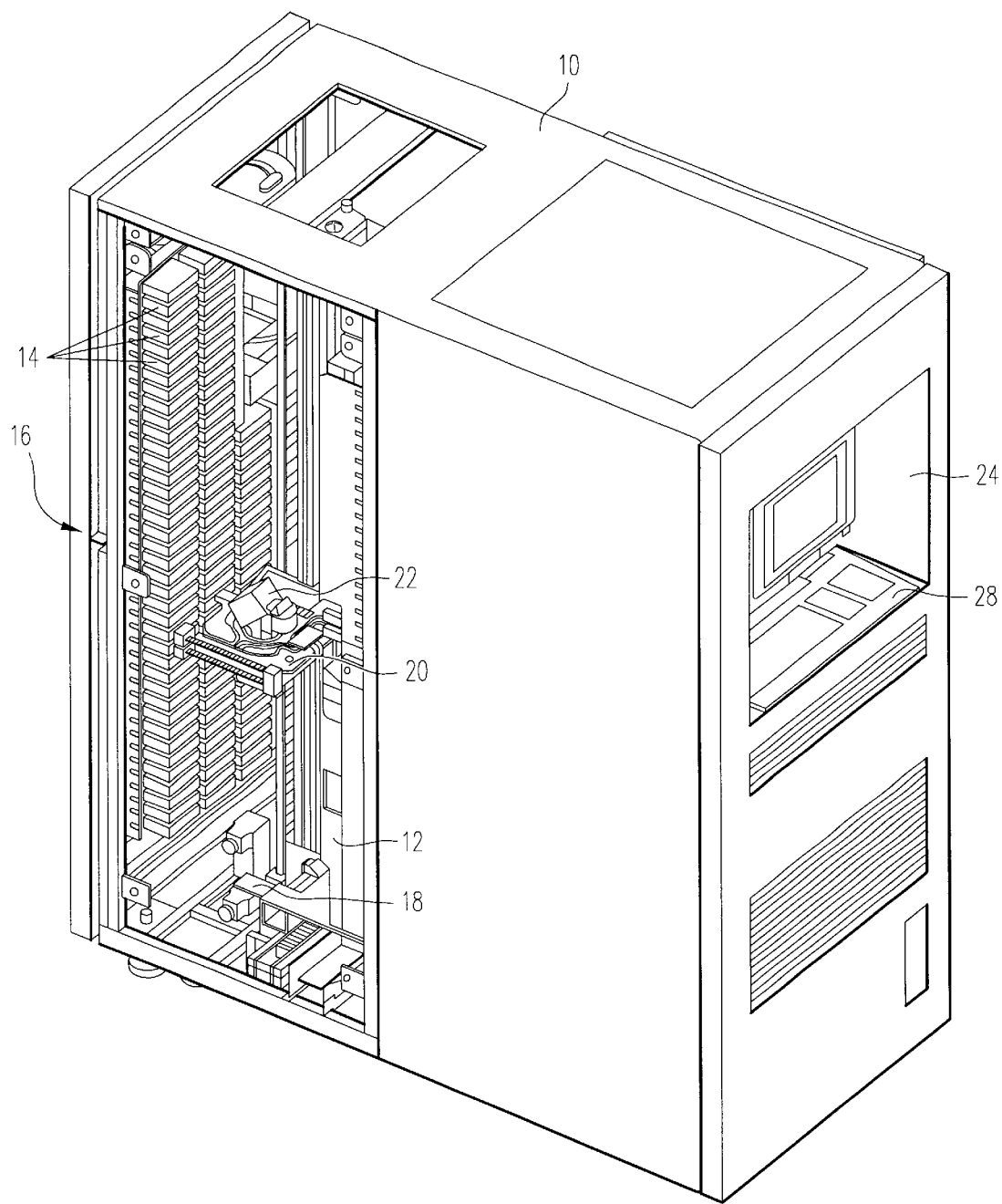
FIG. 1 is an isometric view of a tape library of the present invention.

FIG. 1 is an isometric view of a library unit 10 for storing and accessing data storage media capable of having plural logical data volumes thereon. An example of a library unit 10 is IBM's Magstar 3494 Tape Library Dataserver. The library unit 10 includes one or more data drive units 12, media cartridges 14 located in storage bins 16, and accessor 18, and a library manager 24. The storage bin 16 may be divided into a plurality of subsets known as frames. The accessor 18 transports a selected cartridge 14 between a storage bin cell 16 and a drive 12. The accessor 18 includes a cartridge gripper 20 and a bar code scanner 22, or similar read system, mounted on the gripper 20, to read identifying cartridge labels. Cartridge labels contain a volume serial number (VOLSER) in bar code form. Other types of identifying labels and scanners could be used. For example, there could be an electromagnetic wireless reader and corresponding electronic ID device in each cartridge. The drives 12 can be optical disk drives or magnetic tape drives and the cartridges can contain optical or magnetic media, respectively, or any other removable media and associated drives. In the preferred embodiment, the drives are tape drives.

The library manager 24, which includes at least one computing processor, is interconnected with, and controls the actions of, the drives 12 (through their associated controllers) and the accessor 18. The library manager is also provided with a control panel or keyboard 28. Library manager 24 is provided with memory storage (typically one or more hard disk drives) for storing data tables and programs.

Figure 2:
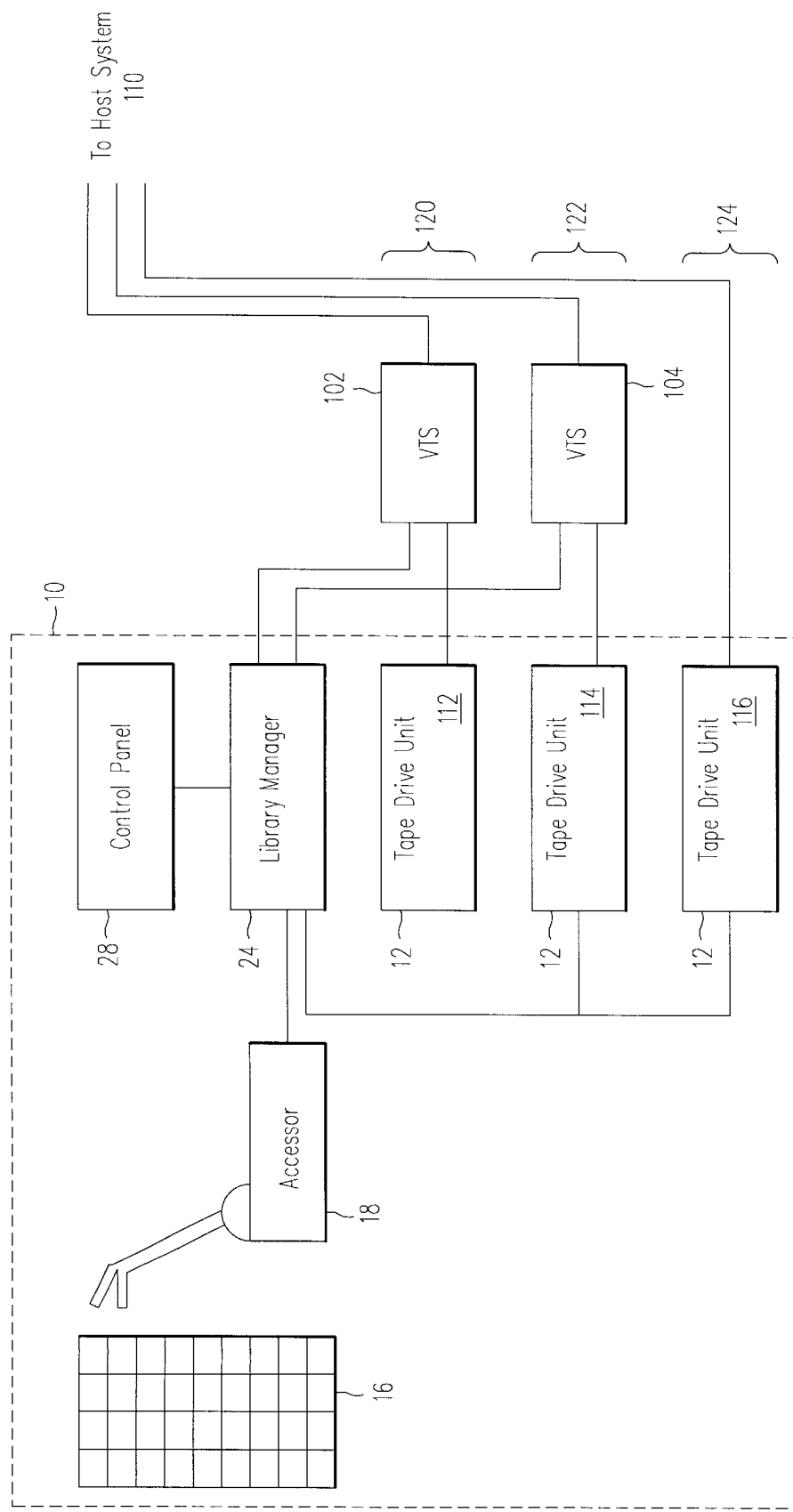
FIG. 2 is a block diagram of an embodiment of the library of FIG. 1.

FIG. 2 is a schematic diagram of a removable media library system and is designated by the general reference number 100. System 100 comprises a tape library unit 10, a first virtual tape server 102 and a second virtual tape server 104. Virtual tape (VTS) 102, 104 may be IBM Magstar Virtual Tape Server Units. Servers 102, 104 include at least one computer processor, and memory storage (typically one or more hard disk drives which function as a cache and storage). Servers 102, 104 are connected to the library manager 24 and tape drives 12. Server 102 is connected to tape drives 112 and server 104 is connected to tape drives 114. A tape drive 116 is connected to library manager 24.

The system 100 is known as a partitioned library because the tape library is divided into one or more partitions.

In the case of system 100, the library is divided into three partitions. A first partition 120 comprises VTS 102 and tape drives 112. A second partition 122 comprises VTS 104 and tape drives 114. A third partition 124 comprises tape drive 116. The tape drives 112, 114 and 116 may be IBM 3590 tape drives in the preferred embodiment. Partition 120, 122 and 124 are all connected to a single host computer system 110 in the preferred embodiment. Alternatively, each partition 120, 122 and 124 could be connected to a separate host computer system.

The individual cartridges 14 each have their own volume serial number or VOLSER, and are know as physical volumes. Each physical volume has many individual pieces of data. These individual pieces of data are known as logical volumes. The library manager stores a library manager database map in its internal memory. This database keeps track of all the physical volumes and where in the bins 16 each is located. The library manager database also contains data which identifies which virtual tape server (VTS) and tape drives are associated with each cartridge.

Each of the VTS 102, 104 contain their own VTS database map stored in their own internal memory. This VTS database identifies each piece of data known as a logical volume, on which physical volume it is located, and the location on the physical volume where it is located.

Figure 3:
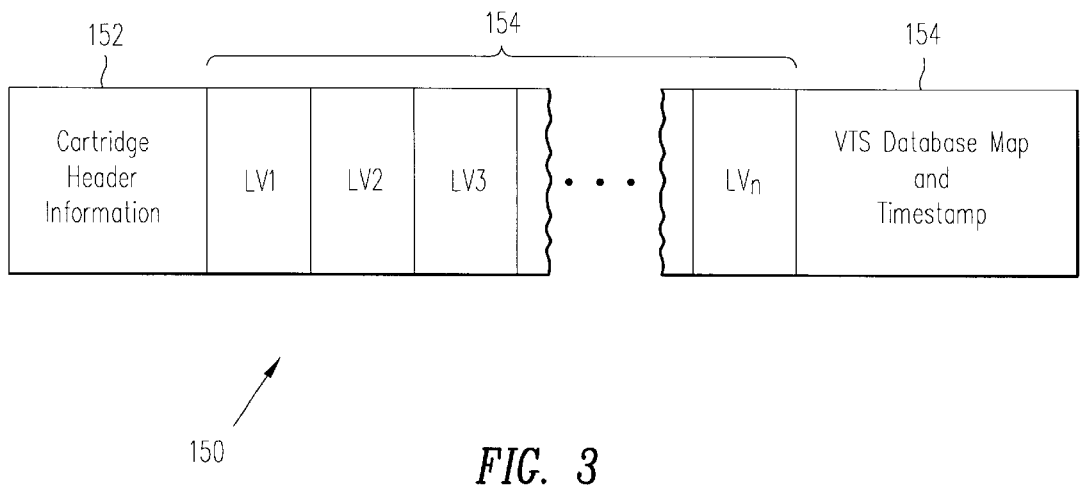
FIG. 3 is a block diagram of the tape format.

FIG. 3 shows a diagram of the format of the data recorded onto the tape cartridges 14 and is designated by the general reference number 150. The first portion of the format comprises a cartridge header information section 152. Section 152 includes such information as the identity of the cartridge or its VOLSER, as well as timing and synchronization information necessary to read the data. The next section 154 comprises a plurality of logical volumes. Each logical volume represents a separate data file to be recorded. These comprise the actual stored data. The final section 154 comprises the VTS database map and database map timestamp. Each time data is written to a cartridge 14, section 154 is updated. Although section 154 is shown as being the final section in the logical format, it may actually be the first physical section on the tape cartridge 14. For example, the IBM 3590 tape cartridge uses serpentine recording with 128 separate tracks. A 3590 tape drive reads 16 tracks at a time. In order to read the entire cartridge, 8 separate passes are needed reading 16 tracks at a time. Thus, the final section 154 is actually physically located at the beginning of the tape cartridge. This allows section 154 to be quickly accessed when it is placed in the drive.

The normal operation of the system 100 may now be understood. When the host 110 desires to write data to system 100, it contacts a selected one of the library partitions 120, 122 or 124. Let us first assume that partition 120 is selected.

The host 110 signals VTS 102 that it desires to write data and then transfers the data to VTS 102. VTS 102 stores the data received from the host as logical volumes in its cache on hard disk drives. It does not store the data immediately to the tape cartridges 14. As more data is received from the host 110, VTS 102 continues to store the data until it has stored a number of logical volumes equal to that necessary to completely fill a single tape cartridge 14. At this point, VTS 102 signals library manager 24 to mount a blank tape 14 into tape drive unit 12. The library manager 24 then looks at its library manager database to locate a blank cartridge 14 associated with VTS unit 102. The appropriate cartridge 14 is then loaded into tape unit 112 and library manager 24 notifies VTS 102 that a particular VOLSER has been mounted in tape unit 112 and is ready for writing. VTS 102 then writes the data to the tape cartridge, filling the entire cartridge. The updated VTS database map and a VTS database map timestamp is also written at this time.

If the host 110 desires to write data to library partition 124, it signals tape drive unit 116. This signal is transparently passed through tape drive unit 116 to library manager 24. Library manager 24 then consults its library manager data base to identify a blank cartridge associated with partition 124. Library manager 24 then causes accessor 18 to mount the appropriate cartridge 14 into tape drive unit 116. Library manager 24 then signals host 110 transparently through tape drive 116 that writing may commence. The host 110 then sends a single volume to tape drive unit 116. Tape drive unit 116 then writes the single volume onto a tape cartridge. Library manager 24 then returns the tape cartridge to the bin 16.

The advantages of the VTS units 102 and 104 may now be understood. The use of hard disk cache in both units allows them to access data at disk drive speeds. In addition, VTS units are able to maximize the efficiency of the tape library by writing each tape cartridge to full capacity.

When the host 110 requests to read data, it sends a request command to a desired partition of system 100. Assume that partition 120 is selected. The command is transparently passed through the VTS 102 unit to the library manager 24. Library manager 24 receives the command and acknowledges back to the host 110 that it has received the command. It then passes along the request to the requested VTS 102. The VTS 102 receives the message from the library manager 24. The VTS 102 then looks at the logical volume and determines from its database upon which physical volume VOLSER it is located. VTS 102 then sends a message to the library manager 24 to mount the appropriate physical volume. Library manager 24 then looks up the address of the physical volume requested and instructs the accessor 18 to pull the cartridge from the appropriate bin 16 and mount the cartridge in the drive 112 which is associated with VTS 102. Library manager 24 then sends a message to VTS 102 that the mount is complete.

VTS 102 then controls tape drive 112 to locate the address of the requested logical volume on the cartridge. The logical volume is then read into the memory of the VTS 102. VTS 102 then signals the host that the data is ready to be read. After the data has been read, the cartridge (physical volume) is returned to the appropriate location in bin 16.

In a disaster recovery situation, the system 100 has experienced a catastrophic failure and the stored data needs to be recovered. In an extreme situation, the library system 100 may have been destroyed by a natural disaster and all the surviving tape cartridges need to be transported to a new library system at a different location. A more common situation is where a key component of the system 100 fails, such as library manager 24 or VTS 102, 104, resulting in the loss of the stored database maps. Before normal operations can be resumed, these database maps need to be reconstructed.

Figure 4A:
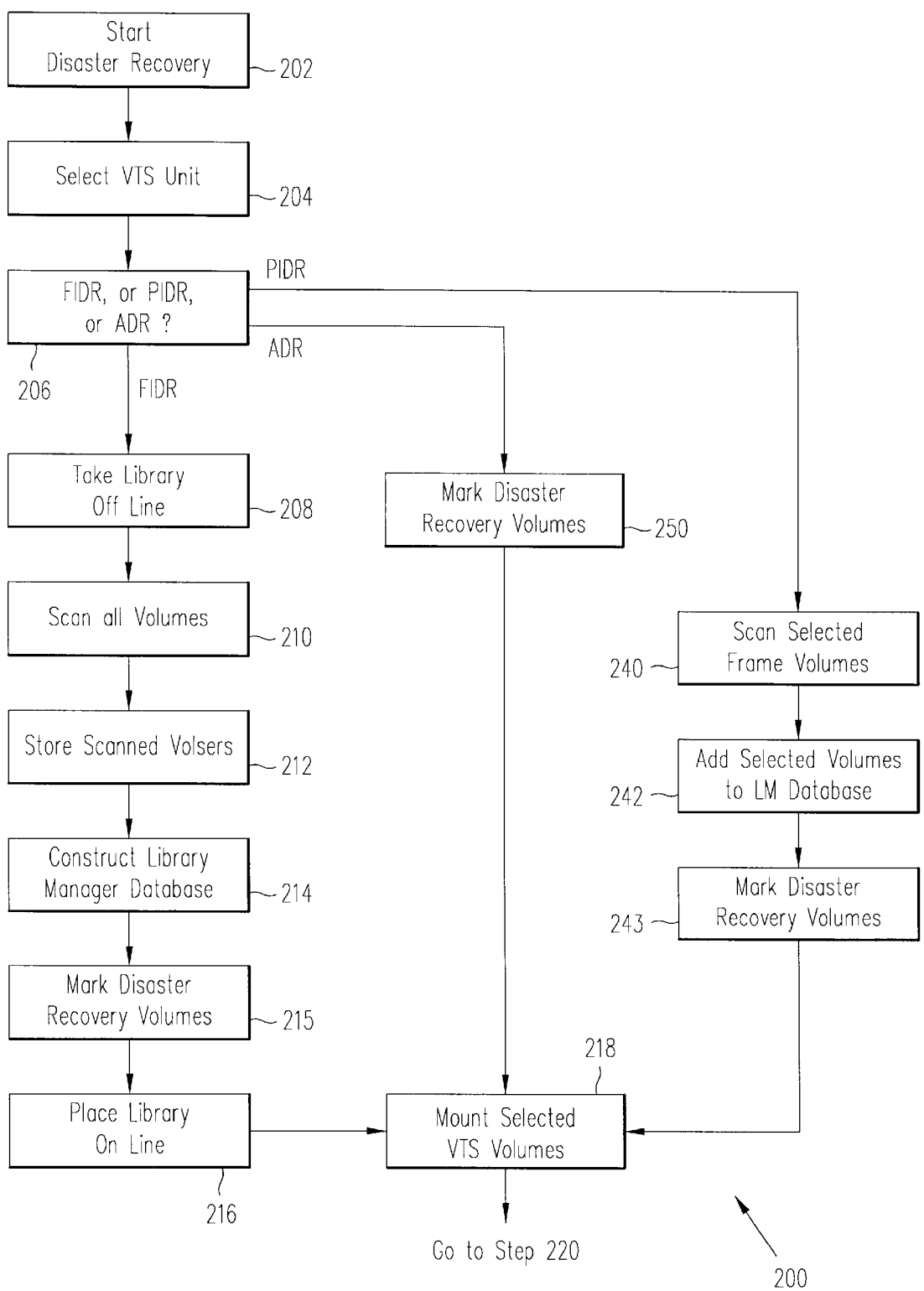
FIGS. 4A and 4B are flow chart diagrams of the disaster recovery method of the present invention.
Figure 4B:
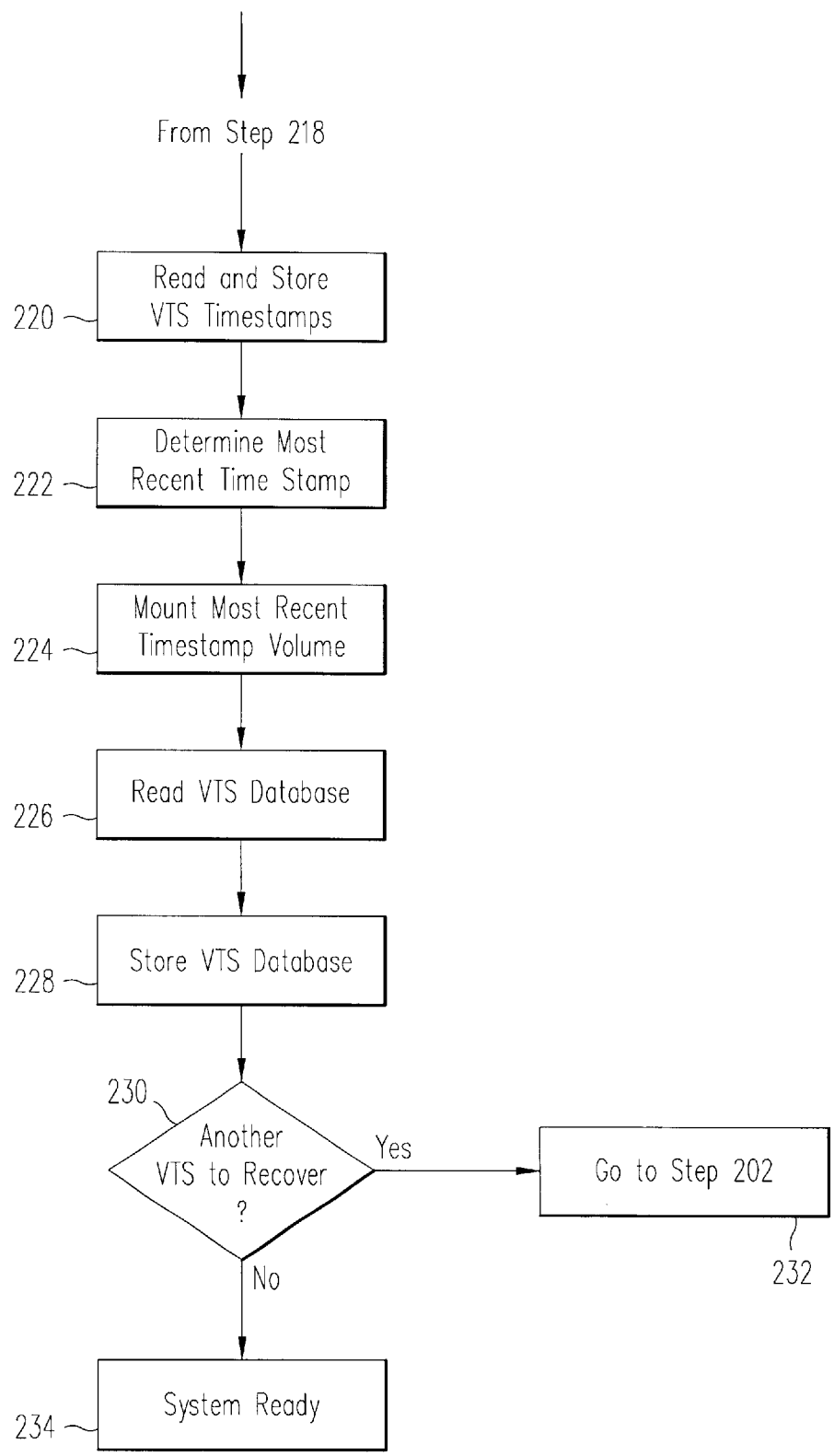

FIGS. 4A and 4B show a flow chart diagram which illustrates the steps of a disaster recovery operation and is designated by the general reference number 200. At a step 202, the human operator instructs the library manager 24 to start the disaster recovery operation by entering the commands at the control panel 28. At a step 204, the VTS unit upon which disaster recovery is to be performed is selected based upon the commands entered in step 202. At a step 206, the library manager 24 determines from the entered command, if a full inventory disaster recovery operation (FIDR), a partial inventory disaster recovery operation (PIDR), or an automatic disaster recovery operation (ADR) is required.

If the FIDR is selected, then at a step 208, library system 100 is taken offline. When the library is taken offline, a message is sent from library manager 24 to the host system 110 informing the host that the system 100 is not available. At a step 210, the library manager 24 instructs accessor 18 to scan the VOLSER of each tape cartridge 14 in the bin 16. At a step 212, the scanned data is stored in the library manager 24. At a step 214, the library manager 24 uses the information scanned from the cartridges 14 and the location where the accessor 18 scanned each cartridge to reconstruct the library manager database map. As part of the operation, the library manager 24 is instructed that certain ranges of VOLSERS are associated with certain VTS units. This information is entered now or may have been part of the commands entered at step 202. At a step 215, the library manager 24 marks the volumes associated with the VTS being recovered as disaster recovery volumes. At a step 216, the library manager 24 instructs the host 110 that the library system is back on line. The non-VTS partition 124 and VTS partitions not selected in step 204 are now available for use by host 110.

At a step 218, the selected VTS recovers its database by requesting that the library manager 24 mount each of the volumes marked as disaster recovery volumes. At a step 220, VTS database map timestamps for each cartridge 14 are read and stored into the selected VTS. At a step 222, the selected VTS determines the most recent VTS database map timestamp. At a step 224, VTS informs the library manager 24 to mount the cartridge 14 having the most recent timestamp. At a step 226, the selected VTS reads the VTS database map from the most recent cartridge 14. At a step 228, the selected VTS stores the most recent database map into its memory. The recovered VTS is now available for use. At a step 230, the human operator determines if there are additional VTS units which need to be recovered. If there are, then at a step 232, the process starts again at step 202 for each additional VTS. If there are no additional VTS units to be recovered, the library manager 24 signals to the host 110 that the entire system is ready at a step 234.

If a partial inventory disaster recovery operation (PIDR) was selected at step 206, then the process moves to step 240. The PIDR is used in a case where cartridges have been salvaged from a destroyed library system and taken to a backup library system having a spare VTS unit. The salvaged cartridges 14 are placed in the bins 16 in selected locations (frames) of the bins. At step 240, library manager 24 instructs the accessor 18 to scan the VOLSERS of all of the cartridges 14 in the selected frame of bin 16. At step 242, all of these scanned VOLSERS and their locations are then added to the library manager database map. At a step 243, the library manager 24 marks the volumes associated with the VTS being recovered as disaster recovery volumes. The process then moves to step 218. Steps 218 through 228 are the same as described above. The VTS recovers its database by requesting that the library manager 24 mounts each of the volumes marked as disaster recovery volumes, reading and storing the database timestamp, remounting the most recent disaster recovery volume, reading the database backup from the volume, and restoring its database. The recovered VTS is now available for use by the host 110. If another VTS needs to be recovered, at a step 230, then at a step 232, the process returns to a step 202.

If an automatic disaster recovery operation (ADR) is selected at step 206, then the process moves to step 250. The second partial disaster recovery operation may be used in the case where one or more of the VTS units have suffered a memory failure, thereby losing their VTS database maps. At a step 250, the library manager 24, using program code, marks the volumes associated with the VTS being recovered as disaster recovery volumes. The process then moves to step 218. At steps 218 through 228, a VTS recovers its database by requesting that the library manager 24 mount each of the volumes marked as disaster recovery volumes, reading and storing the database timestamp, remounting the most recent disaster recovery volume, reading the database backup from the volume, and restoring its database. The recovered VTS is now available for use by the host 110. If another VTS needs to be recovered, at a step 230, then at a step 232, the process returns to step 202.

The advantages of the present invention may now be understood. A full inventory disaster recovery operation (FIDR) is very time consuming. The library is taken offline to all hosts. All of the cartridges in the library must be scanned and the library database map then reconstructed. Then the VTS database maps must be reconstructed. However, certain situations do not require a full inventory disaster recovery operation. The present invention allows for selecting the disaster recovery which is most efficient for each type of situation.

A partial inventory disaster recovery operation (PIDR) allows the system to accept salvaged cartridges from another library and get a spare VTS unit in an existing library up and running. An automatic disaster recovery operation (ADR)

allows for the case where one or more VTS units has suffered a memory loss. The affected VTS unit has its database map reconstructed. In both PIDR and ADR operations, the library manager is still in operation and able to answer requests from the host for other partitions in the library. In addition, the time consuming steps reconstructing the library manager database map associated with the full inventory disaster recovery are avoided.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for performing disaster recovery in a removable storage media library, wherein the library comprises a plurality of removable media, a storage bin for storing the media, the bin being divided into separate frames, a plurality of servers, at least one media reader, an access device for moving the media the media between the bin and the readers, the access device having a scanner, a central library manager which controls the access device, the central library manager having a library manager database, the servers each having a server database, the method comprising the steps of:

(a) selecting one of the servers as a recovery server;
(b) selecting between a partial inventory disaster recovery operation (PIDR) and an automatic disaster recovery operation (ADR);
(c) if the PIDR operation is selected, then designating at least one frame in the library as a disaster recovery frame;
(d) scanning all removable media in the selected frame;
(e) adding the scanned media to the set of media associated with the recovery server in the central library database;
(f) designating the set of media associated with the recovery server as disaster recovery media; and
(g) if the ADR operation is selected, then designating the set of media associated with the recovery server as disaster recovery media.

2. The method of claim 1, further comprising the steps of:

(a) mounting each of the disaster recovery media in a media reader, reading and storing a time stamp of each such media;
(b) determining the media having the most recent time stamp;
(c) mounting the most recent time stamp media and reading a server database from said media; and
(d) storing the server database in the recovery server.

3. An article of manufacture for use in a removable storage media library;

wherein the library comprises a plurality of removable media, a storage bin for storing the media, the bin being divided into separate frames, at least one server, at least one media reader, an access device for moving the media between the bin and the readers, the access device having a scanner, a central library manager which controls the access device, the central library manager having a library manager database, the servers each having a server database, said article of manufacture comprising a computer readable storage medium tangibly embodying a program of executable computer instructions which causes the library to execute the steps of:

(a) selecting one of the servers as a recovery server;
(b) selecting between a partial inventory disaster recovery operation (PIDR) and an automatic disaster recovery operation (ADR);
(c) if the PIDR operation is selected, then designating at least one frame in the library as a disaster recovery frame;
(d) scanning all removable media in the selected frame;
(e) adding the scanned media to the set of media associated with the recovery server in the central library database;
(f) designating the set of media associated with the recovery server as disaster recovery media; and
(g) if the ADR operation is selected, then designating the set of media associated with the recovery server as disaster recovery media.

4. The article of manufacture of claim 3, wherein the instructions further comprise the steps of:

(a) mounting each of the disaster recovery media in a media reader, reading and storing a time stamp of each such media;
(b) determining the media having the most recent time stamp;
(c) mounting the most recent time stamp media and reading a server database from said media; and
(d) storing the server database in the recovery server.

* * * * *